United States Patent
Tamaki et al.

(10) Patent No.: US 6,938,553 B2
(45) Date of Patent: Sep. 6, 2005

(54) BATTERY BOX FOR RAILWAY VEHICLE

(75) Inventors: Hisataka Tamaki, Hyogo (JP); Naohiro Hiraoka, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/764,975

(22) Filed: Jan. 26, 2004

(65) Prior Publication Data

US 2004/0157117 A1 Aug. 12, 2004

(30) Foreign Application Priority Data

Jan. 30, 2003 (JP) ........................................ 2003-021401

(51) Int. Cl.[7] .............................................. B60D 11/00
(52) U.S. Cl. ........................... 104/34; 105/50; 180/68.5; 296/26
(58) Field of Search .............................. 104/34; 105/50, 105/51; 180/68.5, 65.1; 414/462, 532; 296/26; 248/453

(56) References Cited

U.S. PATENT DOCUMENTS

| | | | | |
|---|---|---|---|---|
| 1,764,355 A | * | 6/1930 | Schellentrager et al. | 104/34 |
| 3,799,063 A | * | 3/1974 | Reed | 104/34 |
| 3,838,745 A | * | 10/1974 | Kappei | 180/68.5 |
| 4,609,313 A | | 9/1986 | Oshino et al. | |
| 5,301,765 A | * | 4/1994 | Swanson | 180/68.5 |

* cited by examiner

*Primary Examiner*—Frantz F. Jules
(74) *Attorney, Agent, or Firm*—Marshall, Gerstein & Borun LLP

(57) ABSTRACT

A receiving connector 6A and upper and lower guide sockets 7 are mounted on an attachment 9, and the attachment 9 is mounted on a casing 3A by way of a bolt member 16 so that positioning of the attachment 9 is adjustable. Guide rails 5A guide wheels 4 of the movable tray 1 having a connector 6B. Upper and lower guide pins 8 are respectively inserted into the upper and lower guide sockets 7 to be guided. Thereby, the attachment 9 is moved and connectors 6A and 6B are smoothly connected to each other while being aligned.

5 Claims, 15 Drawing Sheets

BATTERY BOX FOR RAILWAY VEHICLE

BACKGROUND OF THE INVENTION

1. Field of the Invention

The present invention relates to a battery box for a railway vehicle that stores a battery as an emergency power source.

2. Description of the Related Art

In general, a railway vehicle is equipped with a battery as an emergency power source to maintain functions such as ventilation within a cabin or lighting within a passenger cabin for a certain time even when supply of an electric power from an electric-car line is cut off or supply of an electric power is cut off due to breakdown of a generator or the like. The battery is typically stored in a battery box mounted on a car body.

In the conventional battery box used in a railway vehicle (e.g., Japanese Utility Model Publications Nos. Sho. 63-46374 and Sho. 63-30674), a movable tray (inner tray) on which a battery is equipped is pulled out from an inside of a casing of the battery box by opening a lid provided on a front face of the casing. The movable tray (battery) is put into and taken out from the battery box for the purpose of maintenance of the battery stored in the battery box, such as liquid level check, cleaning, charging, and replacement.

As shown in FIG. 10, wires 101 of a battery box 100 are directly connected to a battery 102. Therefore, the wires 101 are pulled out together with the battery 102 when a movable tray 103 on which the battery 102 is equipped is being pulled out. More specifically, guide rails 105 are installed on a bottom plate of a casing 100A. The guide rail 105 has longitudinal wall portions on both sides thereof and is therefore U-shaped in cross section. As shown in FIG. 11, when the movable tray 103 is pulled out from the casing 100A, a wheel 104 provided on a lower face of the movable tray 103 is guided along the guide rail 105 of the casing 100A.

When the movable tray 103 is moved onto a vertically movable up-down table of a table lift, the table lift is moved to a vicinity of the battery box and positioned by fixing a wheel of the table lift. Then, the up-down table of the table lift is set substantially as high as the movable tray 103, and the movable tray 103 equipped with the battery 102 is moved onto the up-down table.

SUMMARY OF THE INVENTION

In the conventional battery box 100 for a railway vehicle, since the wires 101 move together with the movable tray 103 when the movable tray 103 is being pulled out as described above, the wires 101 have an extra length sufficient to move together. For this reason, when the battery 102 is stored and pulled out, the wires 101 tend to be twisted or damaged. In addition, a storage space is necessary within the battery box to allow a movable portion (extra-length portion) of the wires 101 to move therein and a protection member such as a wire protection plate needs to be provided to protect the wires 101. Under the circumstances, it is difficult to make the battery box small-sized.

Commonly, a battery is moved onto a table lift in such a manner that a movable tray is first lifted up with the tray partially being present within a battery box and then is pulled out. In this case, the movable tray (battery) may interfere with the battery box. A space for permitting this movement makes it further difficult to obtain a small-sized battery. On the other hand, when the movable tray is horizontally moved onto the table lift without being lifted up, a gap between the up-down table and the battery box is not constant, and a course of the movable tray moving on the table lift varies, so that movement of the movable tray is not stabilized. In particular, such a varying course of the movable tray is problematic, because the battery has a heavy weight.

The present invention has been developed under the circumstances, and an object of the present invention is to provide a small-sized battery box by realizing wiring between battery wires and wires within a casing of the battery box through connectors having an automatic aligning function, without movement of the wires which conventionally occurs.

Another object of the present invention is to achieve stable movement of a movable tray when the movable tray is moved onto a table lift.

According to the present invention, there is provided a battery box for a railway vehicle comprising a casing mounted on a car body of the railway vehicle; a lid member configured to open and close an opening of the casing; a movable tray equipped with a battery and stored within the battery box, the movable tray being capable of being pulled out through the opening; a connector provided on the movable tray; a battery wire configured to electrically connect the connector to the battery; a receiving connector provided on the casing, the connector being separably connected to the receiving connector; a wire provided within the casing and configured to electrically connect the receiving connector to a wire provided in the car body; a guide means configured to guide the movable tray to cause the connector to be connected to the receiving connector; and an aligning means provided on the movable tray and the casing and configured to align the connector and the receiving connector when the movable tray is stored in the casing. As used herein, "battery wire" means an electric wire connecting the connector to the battery and "wire provided within the casing" means an electric wire connecting the receiving connector to a breaker to which the wire provided in the car body (connected to various equipment) is connected. The breaker is included in the wire provided in the car body. Also, "aligning the connector and the receiving connector" includes alignment made by displacing only the connector with respect to the receiving connector, alignment made by displacing only the receiving connector with respect to the connector, and alignment made by displacing the connector and the receiving connector with respect to each other. Further, "battery" is composed of a plurality of battery cells.

In accordance with the above construction, when the movable tray (battery) is pulled out from and put into the battery box for the purpose of maintenance, such as liquid level check, cleaning, charging, and replacement of the battery, electric connection and disconnection between the wire within the casing and the battery wire is achieved by using connectors. By doing so, it is not necessary for the wire (electric wire) to have an extra length sufficient to move together with the movable tray. When the movable tray is pulled out from an inside of the casing (battery box) for the purpose of maintenance, the movable tray equipped with the battery (including the battery wire), is completely separated from the casing by separating the connectors. Therefore, a space in which the wires having an extra length are stored becomes unnecessary, and the battery box is advantageously small-sized.

When the movable tray is stored, the movable tray is guided by the guide means to cause the connector to be connected to the receiving connector. So, fine adjustment is sufficient in alignment by the aligning means, and the connector can be electrically connected to the receiving connector smoothly.

It is preferable that the guide means is comprised of a guide rail provided within the casing and having a protruding portion extending along a longitudinal direction of the rail, the protruding portion having a substantially-inverted-U shaped cross-section, and a circumferential concave portion engageable with the protruding portion of the guide rail, the aligning means is comprised of a guide pin provided on one of the movable tray and the casing and a pin receiver provided on the other of the movable tray and the casing, the guide pin being engageable with and disengageable from the pin receiver, the battery box further comprising: a first locking device provided on the movable tray and the casing and configured to lock the movable tray to the casing upon the connector being connected to the receiving connector.

In accordance with the above construction, since the guide means is configured by using engagement between the guide rail (protruding portion) and the wheel (circumferential concave groove portion), vibration of the movable tray is minimized with a simple structure when the movable tray is being pulled out from the battery box or stored therein. Likewise, by using the guide pin and the pin receiver, the aligning means is easily obtained. When the movable tray is moved from the table lift into the casing, the first locking device locks the movable tray to the casing upon the connector being connected to the receiving connector. As a result, movement of the movable tray is stabilized.

The pin receiver may be supported by the other of the movable tray and the casing so as to be displaceable in a moving direction of the movable tray and in a direction perpendicular to the moving direction.

In the above structure, since the pin receiver is supported so as to be displaceable in the moving direction of the movable tray and in the direction perpendicular to the moving direction, the pin receiver displaces according to the guide pin in the moving direction of the movable tray and in the direction perpendicular to the moving direction, when the guide pin engages with the pin receiver. This facilitates engagement (alignment) between the guide pin and the pin receiver.

Preferably, the battery box may further comprise a positioning stopper provided within the casing and configured to restrict a front end position of the movable tray when storage of the movable tray within the battery box is completed; and an elastic member provided at a rear end portion of the movable tray and configured to elastically press an inner face of the lid member with the lid member closed after the movable tray has been stored in the battery box.

In accordance with the above construction, when storage of the movable tray (battery) is completed, the movable tray is retained between the positioning stopper and the elastic member, and under this condition, the movable tray is elastically pressed against the positioning stopper by the elastic member. This can inhibit play of the movable tray while the railway vehicle is traveling.

The lid member may be locked to an up-down table of a table lift that carries the movable tray placed thereon by means of a second locking device, and the second locking device may be comprised of an engagement receiver provided on the lid member and an engagement member provided on the up-down table so as to be engageable with and disengageable from the engagement receiver, the lid member may have a stopper provided on the inner face thereof to be protrusible and retractable, the stopper being configured to inhibit the movable tray from falling off the lid member provided horizontally in an open state, and a spring member configured to bias the stopper to protrude, and the table lift may have a release member configured to reduce an amount of protrusion of the stopper by engagement with the stopper against a spring force exerted by the spring member when the up-down table set substantially as high as the lid member provided horizontally in an open state is locked to the lid member.

In accordance with the above construction, when the up-down table is locked to the lid member, the amount of protrusion of the stopper can be reduced and a stopper operation by the stopper is released by the release member of the table lift onto which the movable tray is moved. By engagement between the engagement member of the up-down table and the engagement receiver of the lid member, the up-down table is locked to and thereby integrated with the lid member. Thereby, the movable tray is inhibited from falling off the rails while the tray is moving. In this case, it is preferable that the table lift is provided with the guide rail in the same manner.

The above and further objects and features of the invention will more fully be apparent from the following detailed description with accompanying drawings.

BRIEF DESCRIPTION OF THE DRAWINGS

FIGS. 8A to 8C are views showing a state in which the movable tray is not connected to an up-down table of the table lift, in which FIG. 8A is a detailed view of a portion represented by B in FIG. 7, FIG. 8B is a side view of the portion represented by B, and FIG. 8C is a bottom view of the portion represented by B;

FIGS. 9A to 9C are views showing a state in which the movable tray is connected to the up-down table of the table lift, in which FIG. 9A is a detailed view of the portion represented by B, FIG. 9B is a side view of the portion represented by B, and FIG. 9C is a bottom view of the portion represented by B;

DETAILED DESCRIPTION OF THE PREFERRED EMBODIMENTS

Hereinafter, an embodiment of the present invention will be described with reference to the drawings.

Figure 1:
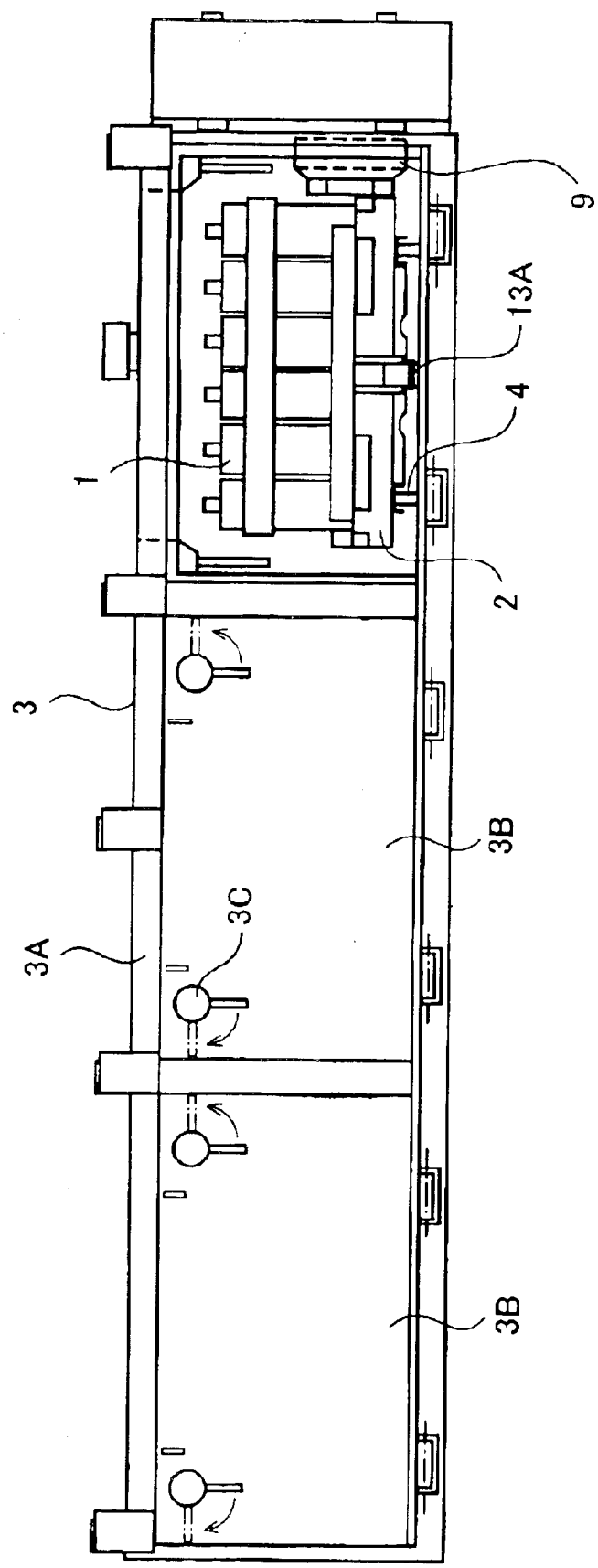
FIG. 1 is a front view showing a state in which a movable tray is stored within a battery box for a railway vehicle according to the present invention, with one of lid members removed.
Figure 2:
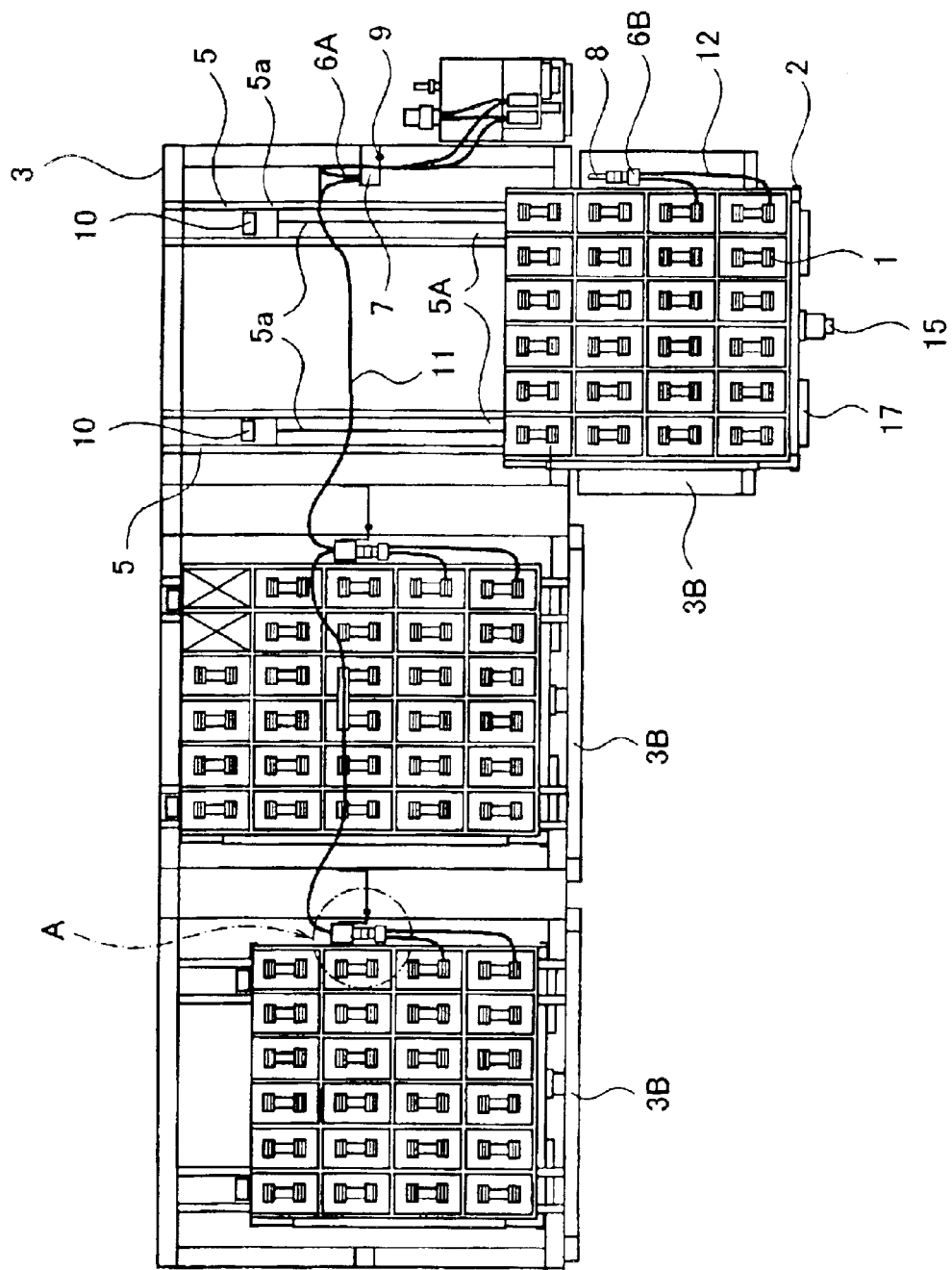
FIG. 2 is a plan view showing a state in which the movable tray is pulled out with one of the lid members being open, with a box ceiling plate removed.

FIG. 1 is a front view showing a state in which a movable tray is stored within a battery box for a railway vehicle according to the present invention, with one of lid members removed. FIG. 2 is a plan view showing a state in which the movable tray is pulled out with one of the lid members being open, with a box ceiling plate (plate that covers a box from above) removed.

As shown in FIGS. 1 and 2, a battery 1 is equipped on a movable tray 2, and stored in a battery box 3 mounted under a floor of a car body of a railway vehicle. It should be appreciated that the size of the movable tray 2 is changed depending on the volume of the battery 1 equipped on the movable tray 2, for example, the number of battery cells.

The battery box 3 is comprised of a casing 3A having a face configured to open horizontally and a lid member 3B pivotable around a hinge (not shown) at a lower edge of the face of the casing 3A so as to be opened and closed. Specifically, an opening of the casing 3A is openably closed by the lid member 3B, and the battery 1 equipped on the movable tray 2 is pulled out through the opening. On right and left sides in an upper portion of the lid member 3B, lock levers 3C are provided to hold the lid member 3B in its closed state.

Figure 7:
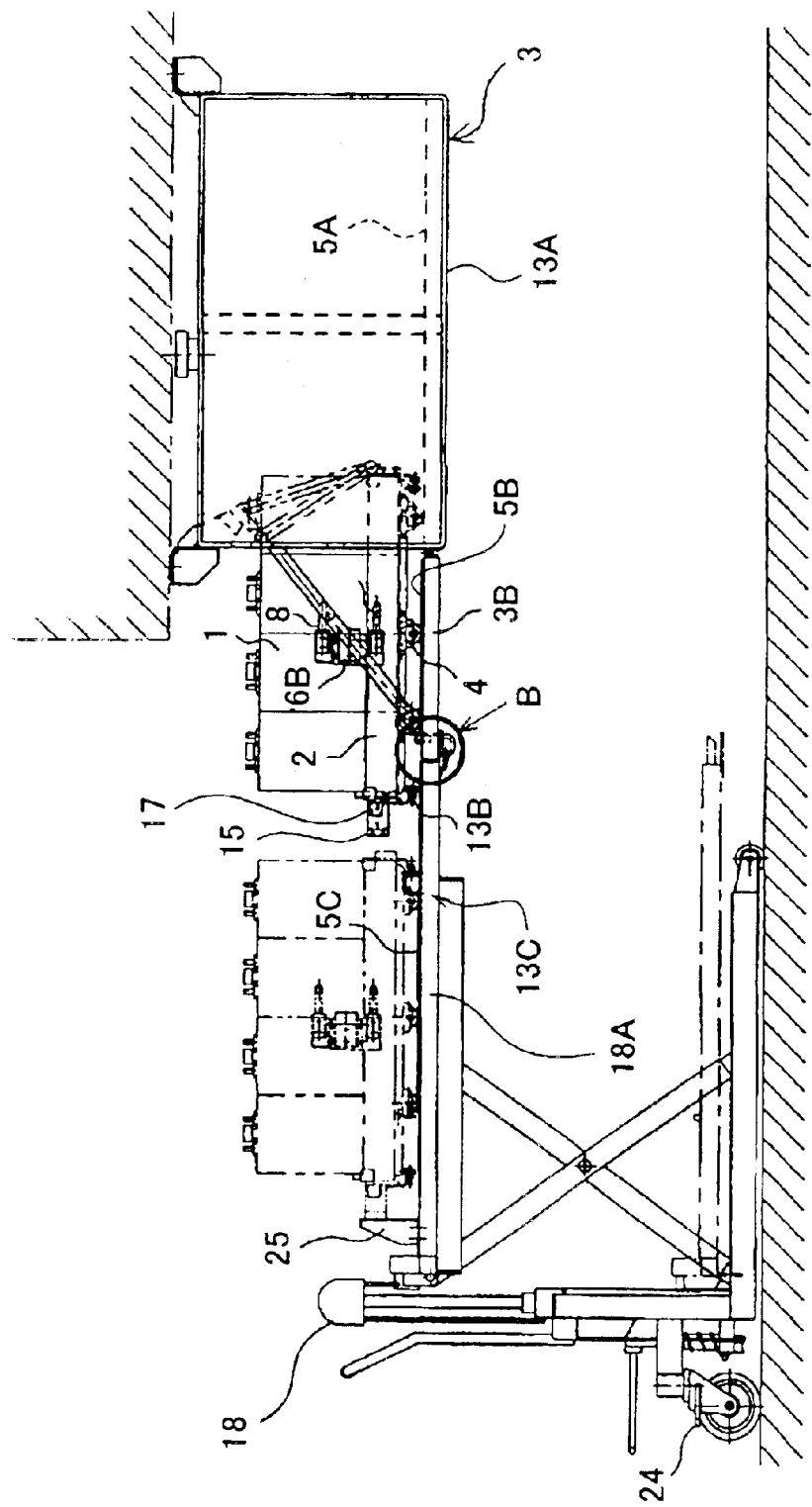
FIG. 7 is side view showing a state in which a movable tray is moved onto a table lift.

The movable tray 2 is provided with wheels 4 rotatably attached on right and left sides of a lower face thereof. While six wheels 4 are attached on right and left sides as shown in FIG. 7 in this embodiment, four wheels 4 may be attached on right and left sides, as a matter of course. On a bottom portion of the casing 3A and an inner face of the lid member 3B, guide rails 5A are provided to allow the wheels 4 to roll thereon.

Figure 3:
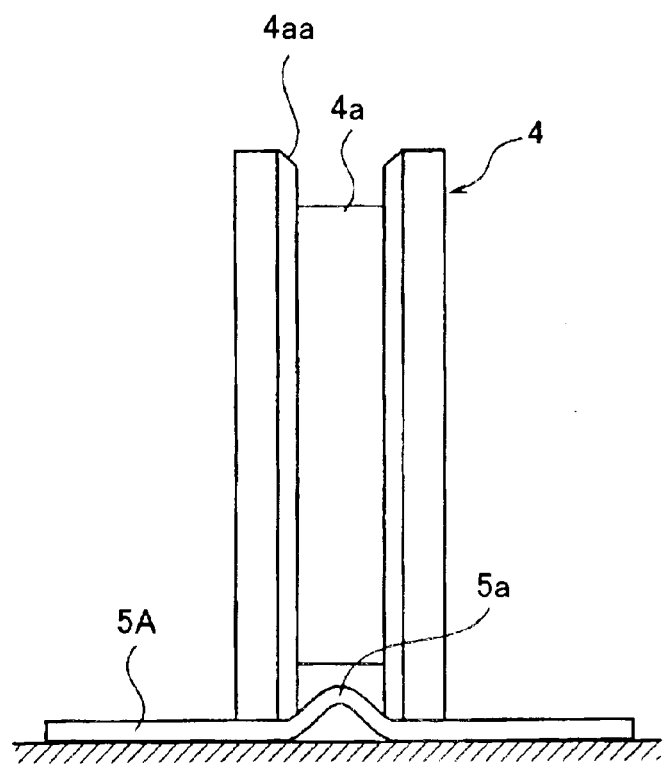
FIG. 3 is a view showing a relationship between a guide rail and a wheel.

As shown in FIG. 3, the wheel 4 is provided with a circumferential concave groove 4a on an outer peripheral face. On right and left outer peripheral sides of the circumferential concave groove 4a, inclined faces 4aa are provided such that the faces 4aa are more distant from each other as they extend outwardly. The guide rail 5A has a protruding portion 5a having a substantially inverted-U shaped cross-section. The protruding portion 5a of the guide rail 5A is configured to engage with the circumferential concave groove 4a. The protruding portion 5a is located at substantially the center position in a width direction of the guide rail 5A and configured to extend along a longitudinal direction of the guide rail 5A. And, by engagement between the protruding portion 5a of the guide rail 5A and the circumferential concave groove 4a of the wheel 4 (by contact between side faces of the protruding portion 5a and the inclined faces 4aa), position of the wheel 4 in the direction perpendicular to the guide rail 5A is restricted when the movable tray 2 is pulled out from and put into the battery box 1.

This allows the wheel 4 to be located at the center of the guide rail 5A. The movable tray 2 is positioned with a slight error in a direction perpendicular to the guide rail 5A, and therefore, alignment is accomplished with fine adjustment in the vicinity of the connectors 6A and 6B as described later. That is, by bringing the inclined faces 4aa of the wheel 4 into contact with both sides of the protruding portion 5a of the guide rail 5A, displacement of the wheel 4 in the direction perpendicular to the longitudinal direction of the guide rail 5A is restricted.

Figure 4:
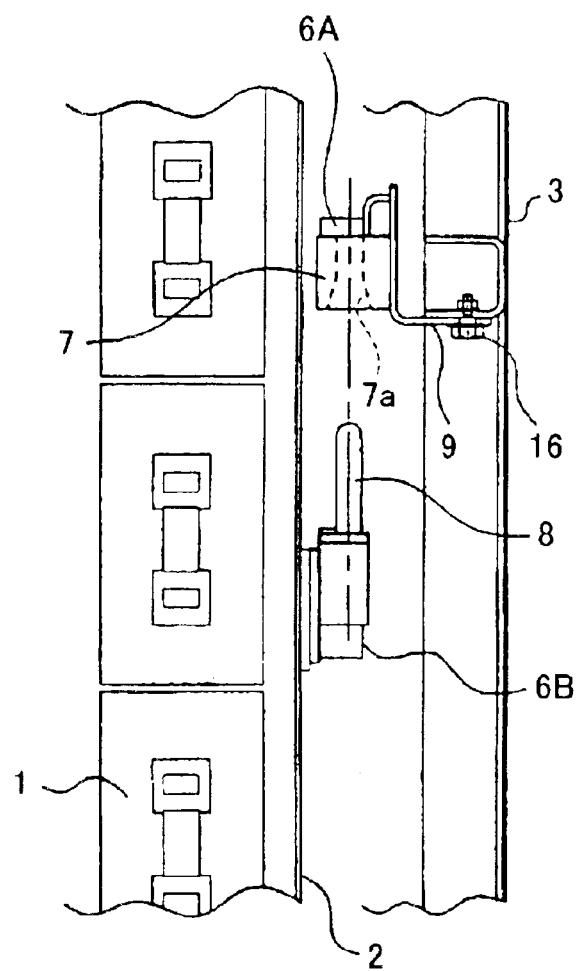
FIG. 4 is a detailed view showing a portion represented by A in FIG. 2.
Figure 5:
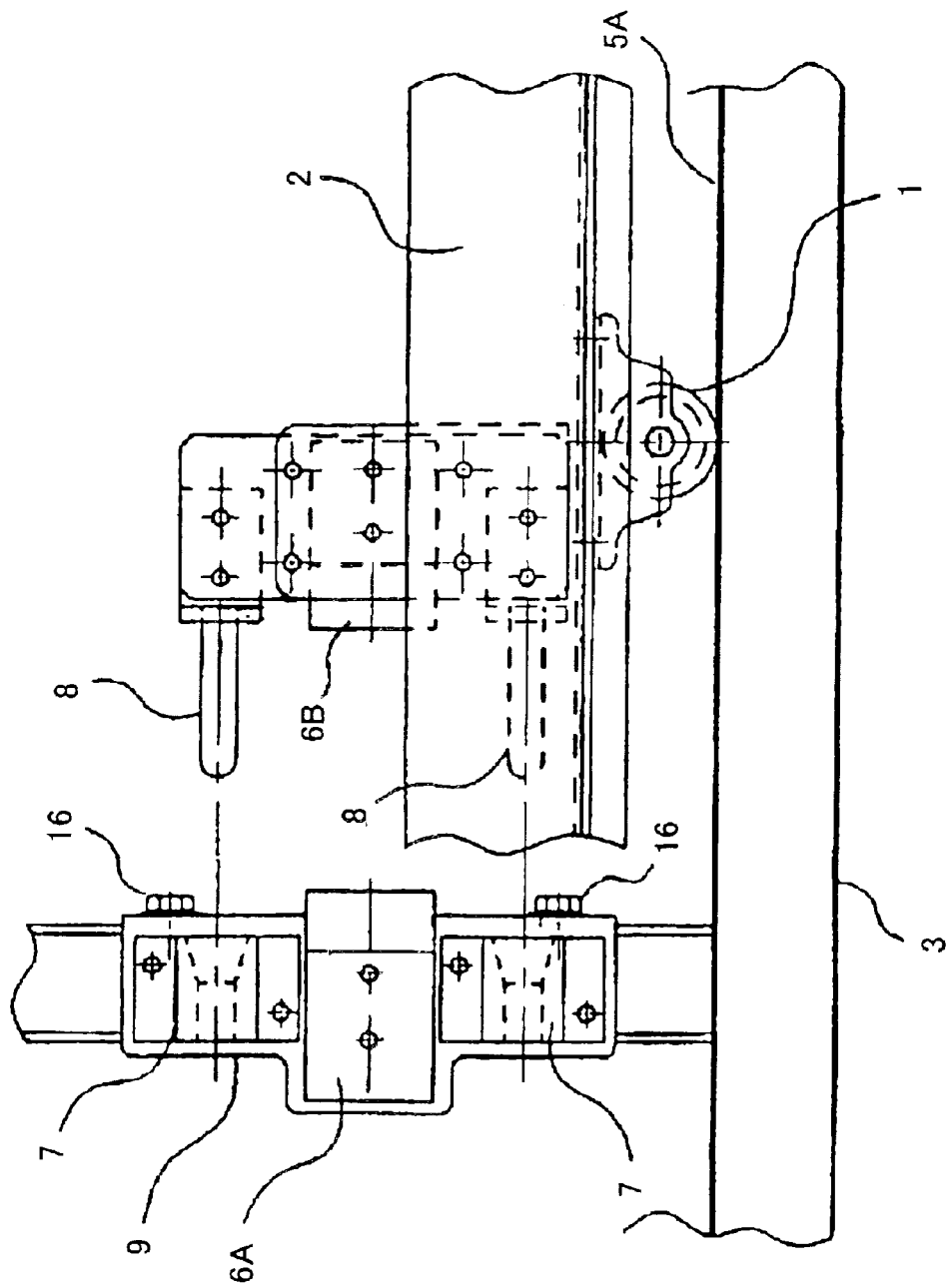
FIG. 5 is a side view of the portion represented by A.

As shown in FIGS. 4 and 5, an attachment 9 is provided on the casing 3A of the battery box 3, and a receiving connector 6A and upper and lower guide sockets (pin receiver) 7 are mounted on the attachment 9. On the movable tray 2, a connector 6B and upper and lower guide pins 8 are provided. The connector 6B is separably connected to the receiving connector 6A. The guide pins 8 are engageable with and disengageable from the guide sockets 7. The receiving connector 6A is electrically connected to wires 11 within the casing 3A. The receiving connector 6A is electrically connected to the wires 11. The connector 6B is electrically connected to the battery wires 12.

The guide pins 8 and the guide sockets 7 form an aligning means for aligning the receiving connector 6A and the connector 6B when the movable tray 2 is stored within the casing 3A. That is, the aligning means is provided on the movable tray 2 and the casing 3A. Since a guide means configured to guide the movable tray 2 to cause the connector 6B to be connected to the receiving connector 6A is comprised of the guide rails 5A (protruding portions 5a) and the wheel 4 (inclined faces 4aa of the circumferential concave groove 4a), alignment by the guide pins 8 and the guide sockets 7 is accomplished with fine adjustment.

And, when the wheels 4 rolls on the guide rails 5A and thereby the guide pins 8 are inserted into the guide socket 7, engagement between the guide sockets 7 and the guide pins 8 allows the receiving connector 6A and the connector 6B to be aligned. Under this condition, connection between the connectors 6A and 6B starts.

The movable tray 2 further advances and a front end of the movable tray 2 is brought into contact with a positioning stopper 10 within the casing 3A that functions to restrict a front end position of the movable tray 2. Thereby, connection is completed. The connectors 6A and 6B are mechanically connected to each other, and under this connected state, the wires 11 within the battery box 3 are electrically connected to the battery wires 12 of the movable tray 2. Upon the connectors 6A and 6B being connected to each other, a first locking device 13A automatically locks the movable tray 2 to the casing 3A of the battery box 3. The movable tray 2 is released from the casing 3A manually. The first locking device 13A is a conventionally well-known automatic locking device. The first locking device 13A is comprised of an engagement receiver provided on the movable tray 2 and an engagement member provided on the casing 3A and configured to be engageable with and disengageable from the engagement receiver of the movable tray 2. Engagement between these members is accomplished using a spring force. By moving the movable tray 2 along the guide rails 5A, locking is accomplished by the spring force, while by moving the movable tray 2 in an opposite direction (the direction in which the movable tray 2 is pulled out), the locking is released against the spring force. Locking by the first locking device 13A is released as in a second locking device to be described later, and therefore, may be provided with a wire and a ring as in the second locking device so as not to interfere with movement of the movable tray 2.

A buffing rubber 15 (elastic member) is provided on a rear end face (rear end portion) of the movable tray 2. The buffing rubber 15 serves to elastically press the inner face of the lid member 3B when the lid member 3B is closed. When the lid member 3B is closed with the movable tray 2 locked to the casing 3A by the first locking device 13A, i.e., with the movable tray 2 stored in the battery box 3, the buffing rubber 15 contacts the inner face of the lid member 3B and elastically presses the inner face so that the movable tray 2 (battery 1) is inhibited from moving within the battery box 3 during travel of the vehicle. Thus, the buffing rubber 15 and the first locking device 13A form a double-locking structure. On the other hand, when the movable tray 2 does not reach the positioning stopper 10, and hence the first locking device 13A does not lock the movable tray 2 to the casing 3A, the lid member 3B is configured not to be closed.

FIGS. 4 and 5 show a detailed structure of a connector connecting portion (receiving connector 6A and connector 6B). The receiving connector 6A and the upper and lower guide sockets 7 are mounted on the attachment 9. The attachment 9 is supported by the casing 3A of the battery box 3 by means of a bolt member 16 with a clearance to be displaceable in the moving direction of the movable tray 2 and in the direction perpendicular to the moving direction.

Since the attachment 9 is movable within a predetermined range when the upper and lower guide pins 8 are inserted into the upper and lower sockets 7, respectively, the connectors 6A and 6B are smoothly connected to each other while being aligned within this predetermined range. The connector 6A is provided at an intermediate position between the upper and lower guide sockets 7 in the vertical direction and the connector 6B is provided at an intermediate position between the upper and lower guide pins 8 in the vertical direction. For smooth alignment, the guide socket 7 has a tapered hole portion 7a and a tip end of the guide pin 8 to be inserted into the tapered hole portion 7a is hemispherical (or tapered).

Figure 6:
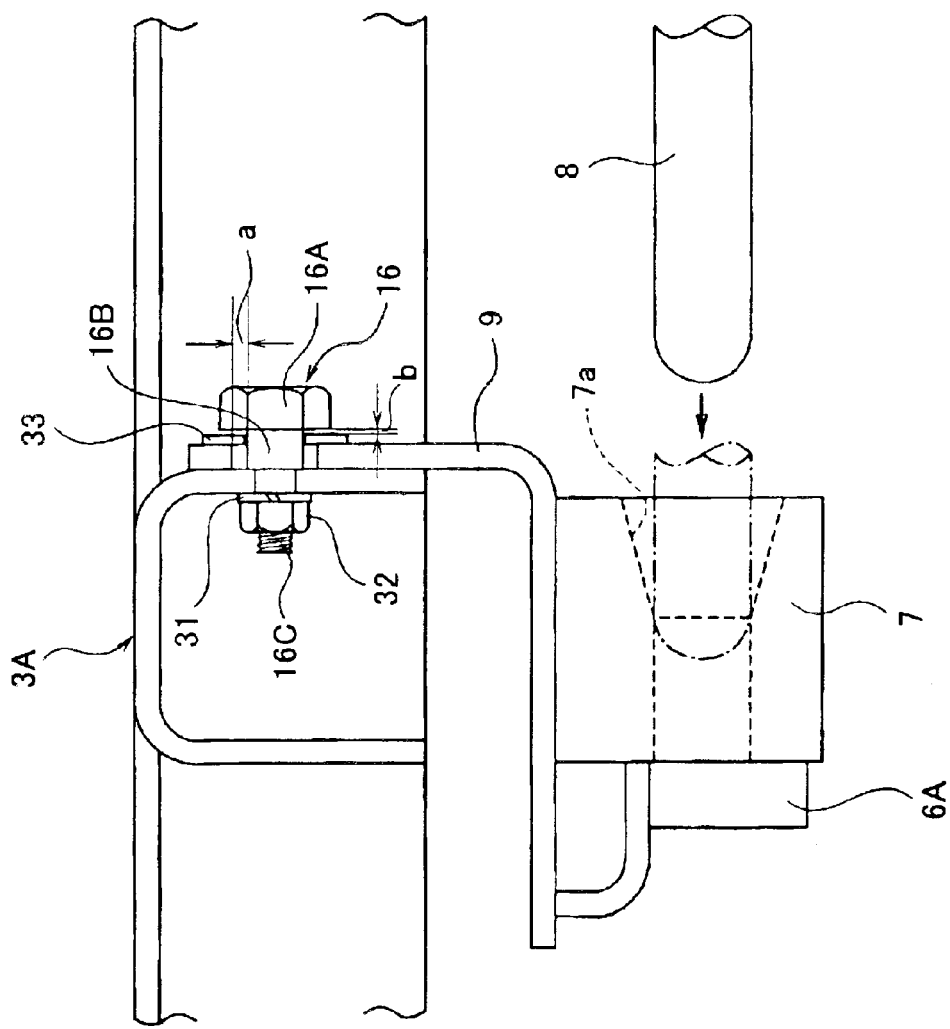
FIG. 6 is detailed view of a support portion of a guide socket.

As shown in FIG. 6, the bolt member 16 is a shoulder bolt comprising a head portion 16A having a hexagonal cross-section, an intermediate large-diameter portion 16B, and a small-diameter portion 16C including a female screw portion. A portion to be mounted of the casing 3A is retained by the large-diameter portion 16B, a spring washer 31 and a nut 32, and the large-diameter portion 16B is inserted so that the attachment 9 and the spring washer 33 have gaps a and b, respectively.

The gaps a and b allow the attachment 9 (including the connector 6A and the guide sockets 7) to be displaceable in the moving direction of the movable tray 2 and in the direction perpendicular to the moving direction, and alignment becomes possible by displacement within the range of these gaps a and b. Because of the above-described engagement between the wheel 4 and the guide rail 5A, the alignment can be accomplished with fine adjustment.

FIG. 7 shows a state in which the movable tray 2 is pulled out from the battery box 3 and moved onto a table lift 18.

A procedure for moving the movable tray 2 onto the table lift 18 is as follows. The lid member 3B is opened, and locking by the first locking device 13A is released manually. Then, by pulling a handle 17 provided at a rear end portion of the movable tray 2, the wheels 4 roll on the guide rails 5A within the casing 3A and the guide rails 5B on the inner face of the lid member 3B. In this manner, the movable tray 2 is pulled out from the casing 3A. Thereby, the connectors 6A and 6B are separated from each other and electric connection is completely cut off.

Figure 8A:
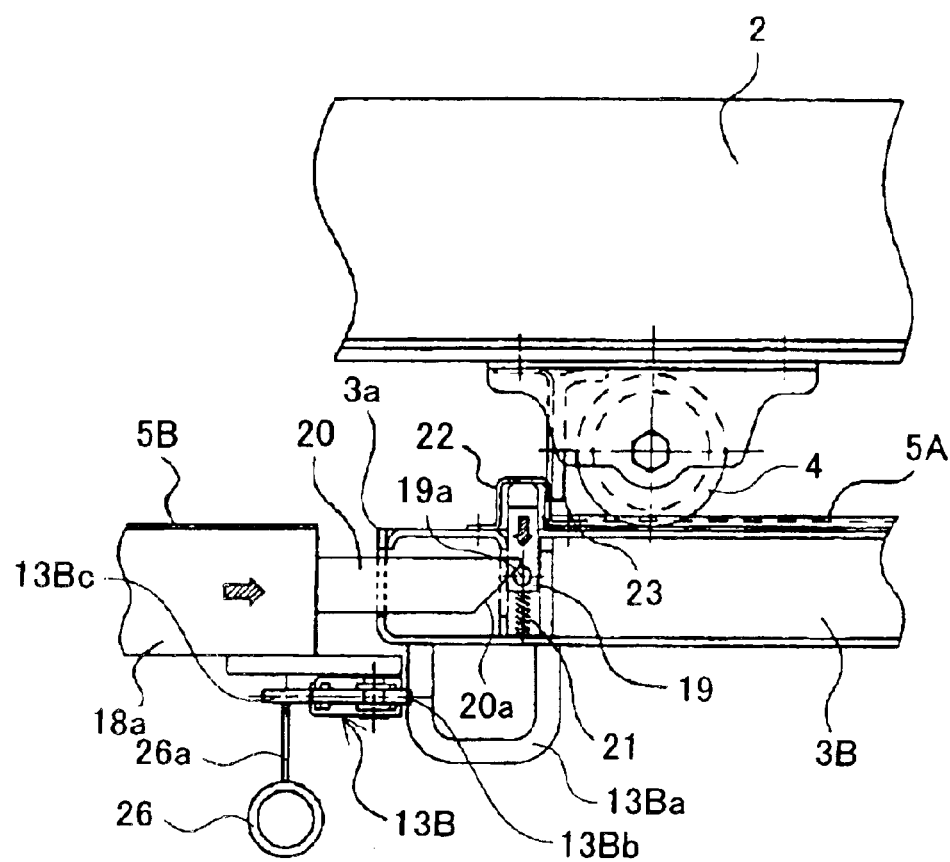
Figure 8B:
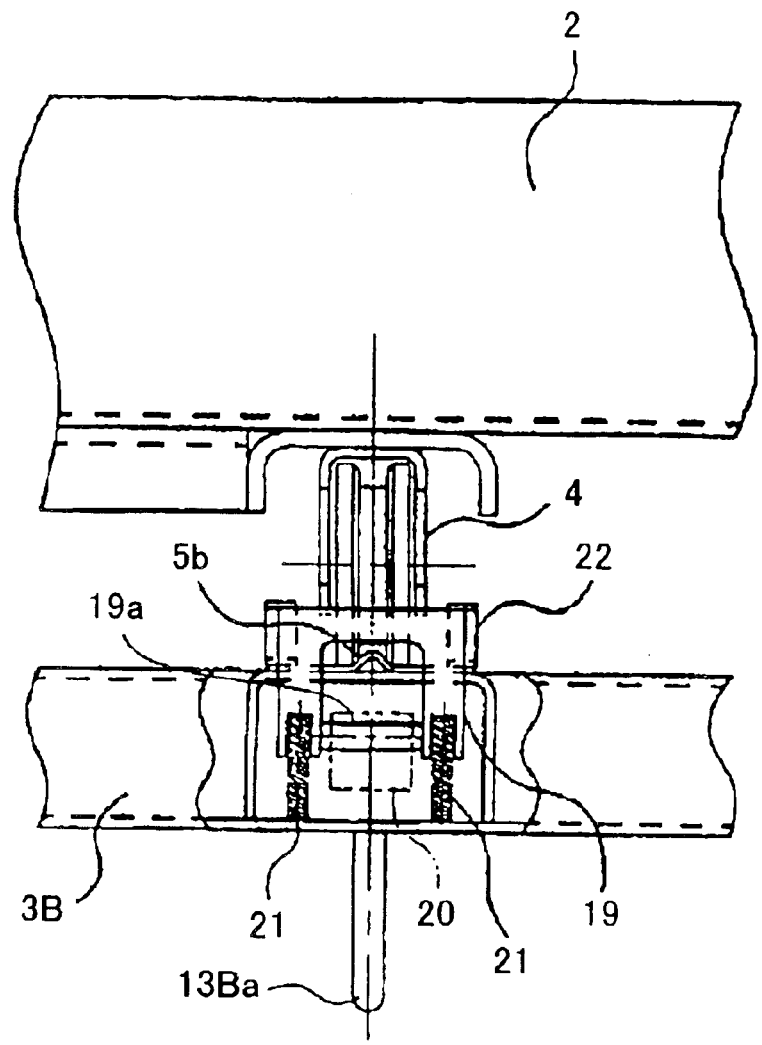
Figure 8C:
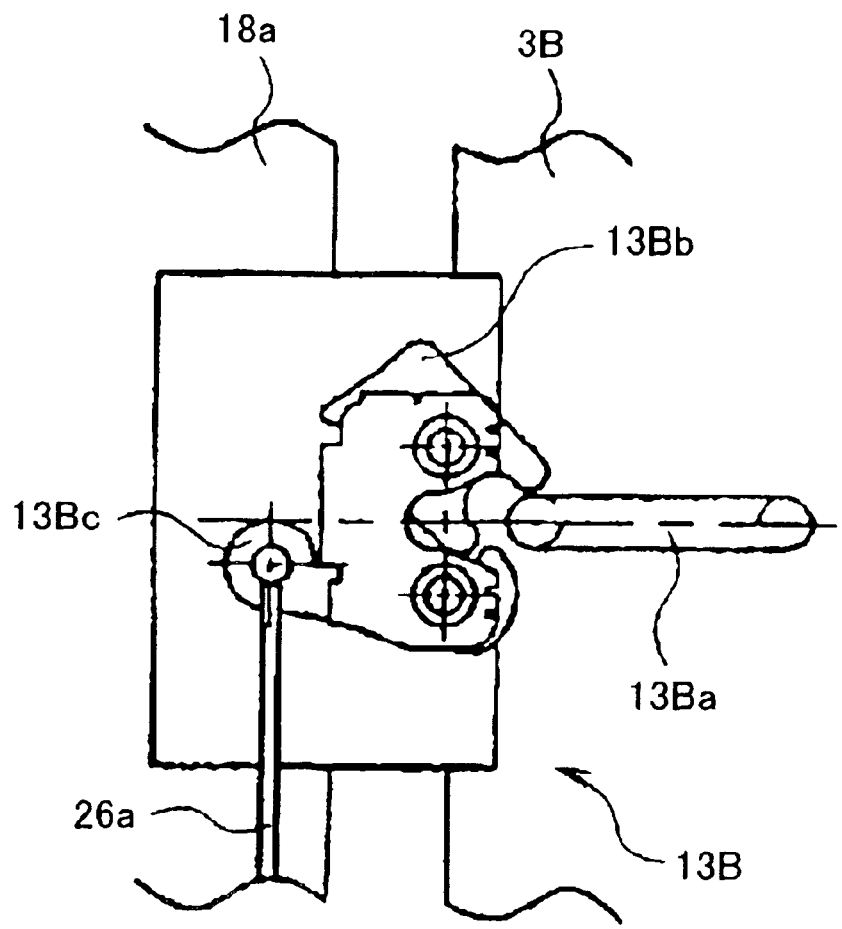

As shown in FIGS. 8A, 8B, and 8C in detail, in order to inhibit the pulled-out movable tray 2 from falling off the lid member 3B, a movable stopper 19 (stopper for inhibiting the movable tray 2 from falling off the lid member 3B) which is substantially inverted-U shaped is provided in the vicinity of an inner-side upper end of the lid member 3B and configured to be protrusible and retractable in the direction perpendicular to the inner face of the lid member 3B.

Maintenance such as liquid check, suppliance, and inspection of the battery 1 is carried out with the movable tray 2 pulled out from the battery box 3. It should be appreciated that, when the movable tray 2 is pulled out, contact metals 23 provided at a front portion of the wheels 4 contact the protruding movable stopper 19, thereby inhibiting the movable tray 2 from falling off the lid member 3B provided horizontally in an open state.

The movable stopper 19 is always biased to protrude upward from an upper end (protruding portion 5a) of the guide rail 5A by a coil spring 21 (spring member). A stopper restricting member 22 (see FIG. 8A) serves to restrict protrusion of the movable stopper 19 within a predetermined amount. The stopper restricting member 22 is fixed on the inner face of the lid member 3B and has a substantially-hat shaped cross-section.

Figure 9A:
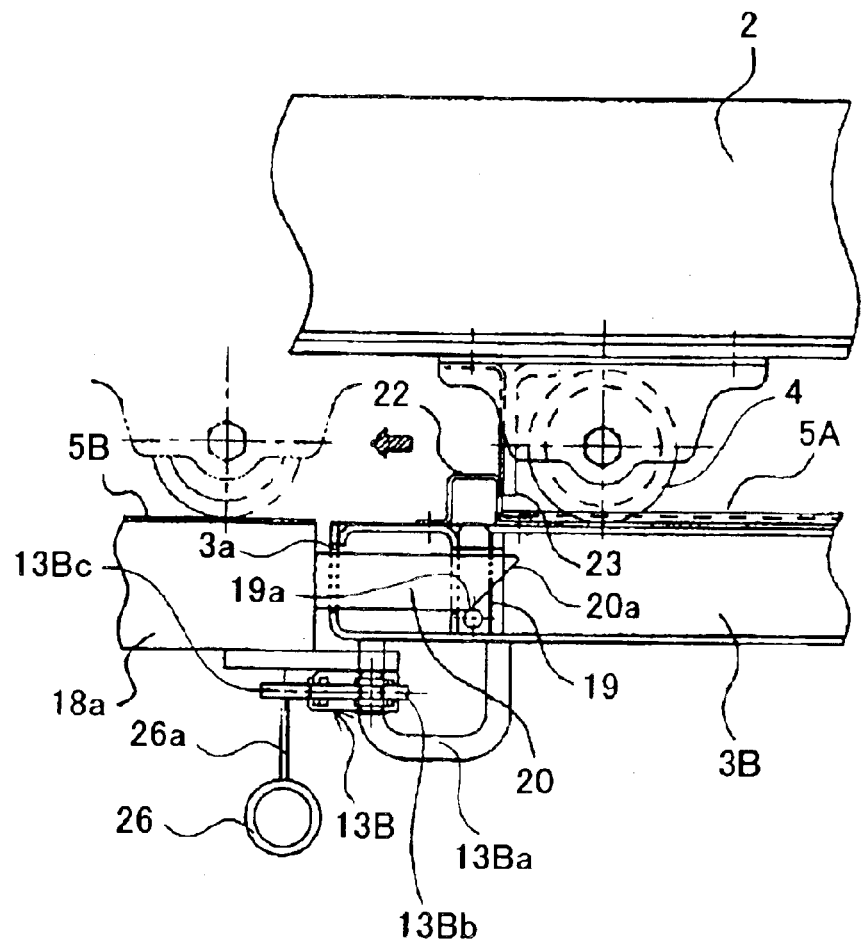
Figure 9B:
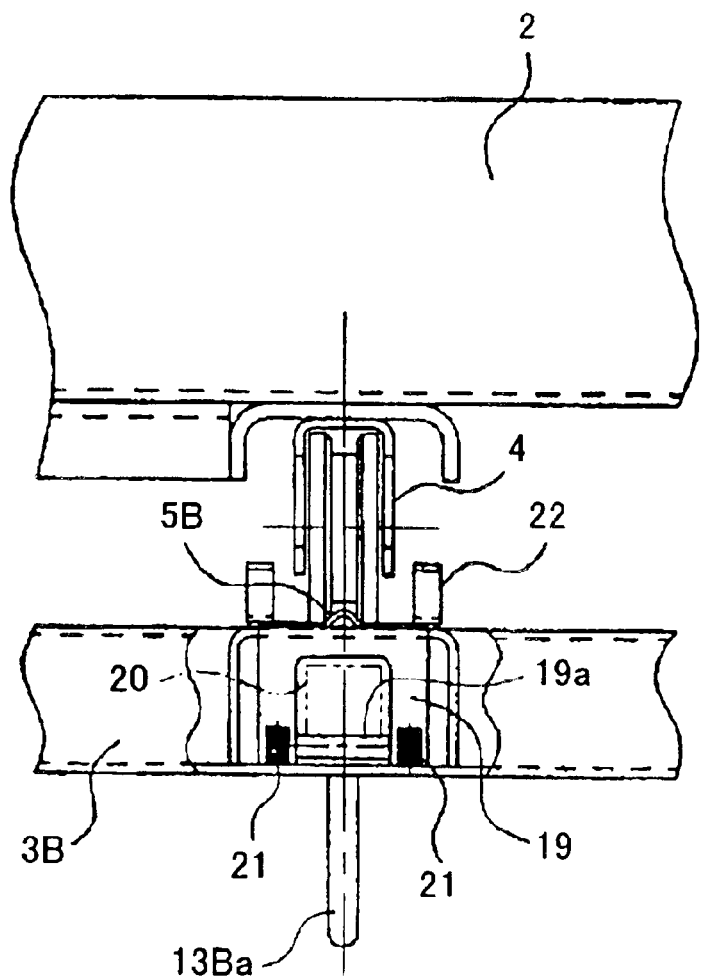
Figure 9C:
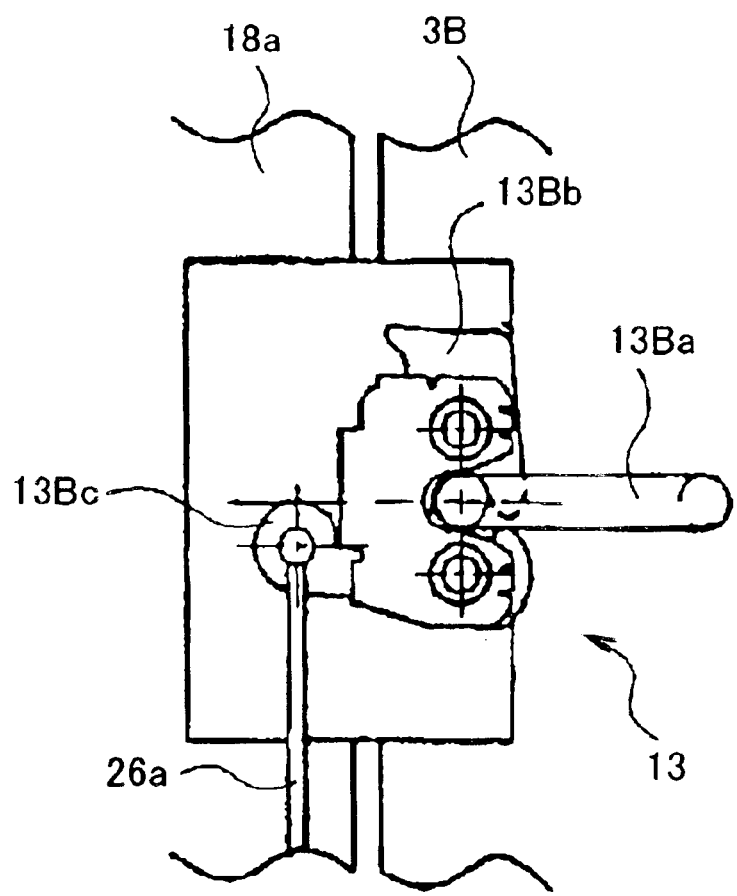
Figure 10:
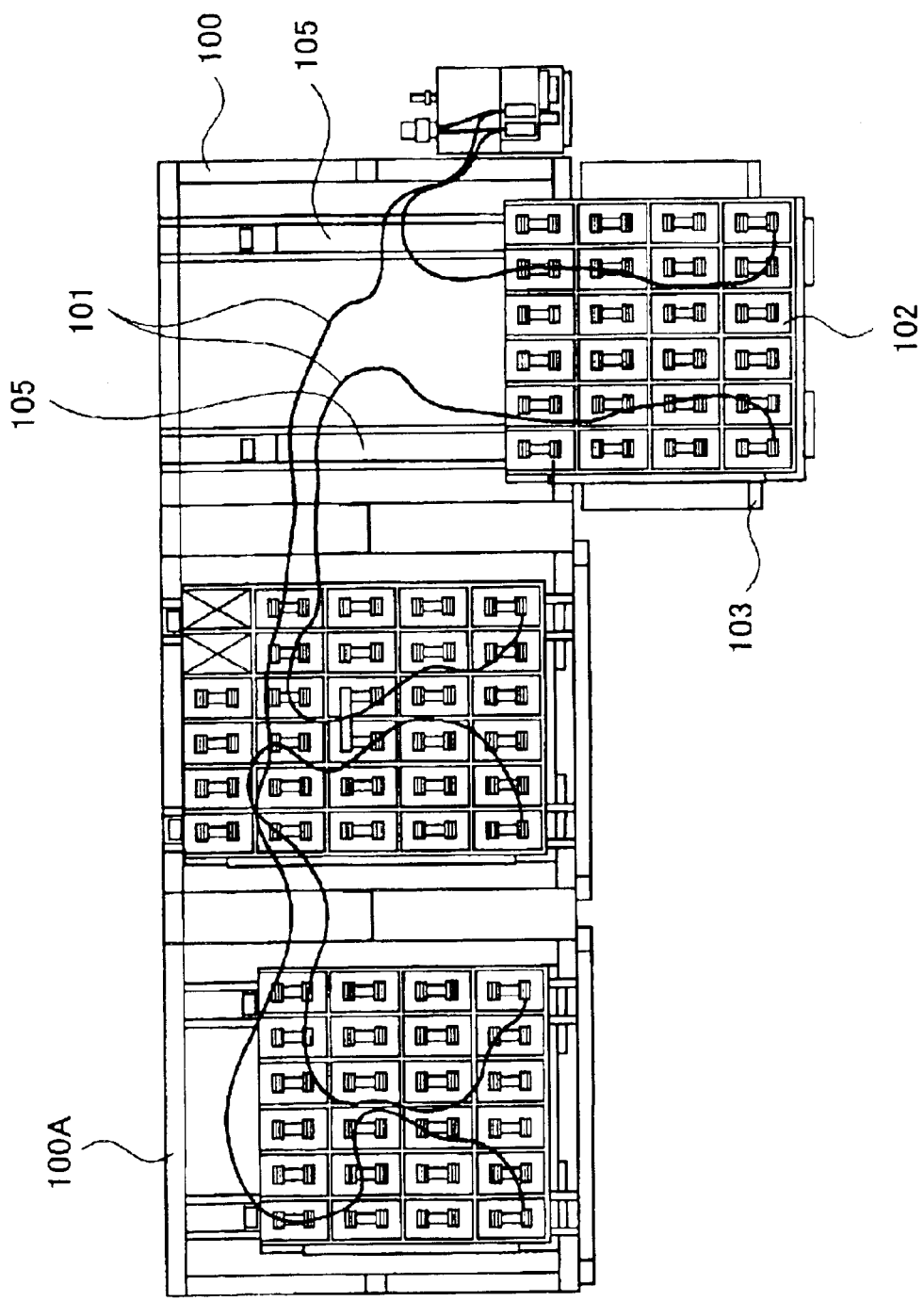
FIG. 10 is a plan view of the conventional battery box for a railway vehicle with a box ceiling plate omitted, showing a state in which the movable tray is pulled out.
Figure 11:
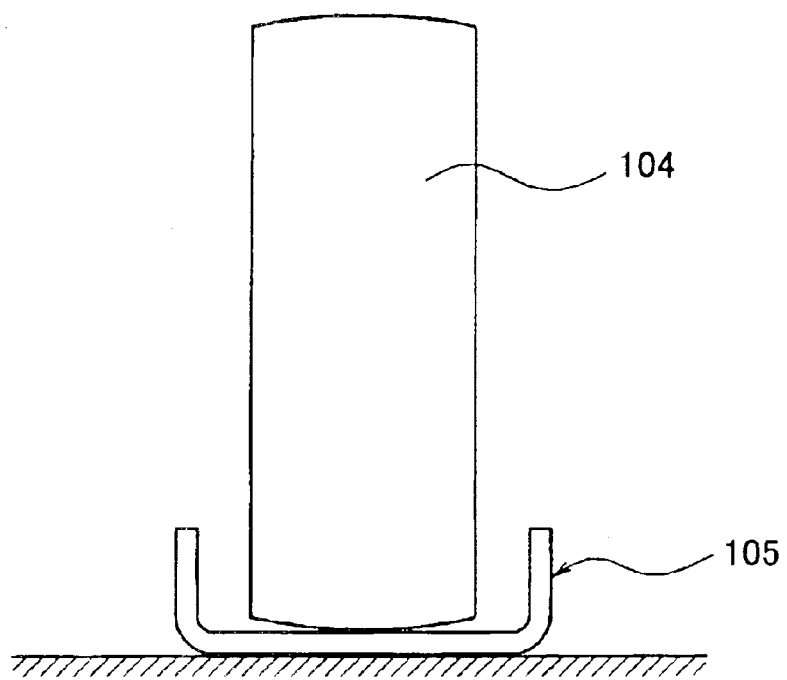
FIG. 11 is a view showing a relationship between a guide rail and a wheel in the conventional battery box for a railway vehicle.

The table lift 18 has an up-down table 18a that carries the movable tray 2 placed thereon. The table lift 18 includes a height adjustment mechanism adapted to make adjustment to allow the up-down table 18a to be substantially as high as the lid member 3B provided horizontally in the open state. A restriction release lever 20 (release member) is provided at a tip end portion of the up-down table 18a to release restriction by the movable stopper 19. With the up-down table 18a set substantially as high as the lid member 3B, the up-down table 18a (table lift 18) is moved closer to the lid member 3B, and then the restriction release lever 20 is inserted into an upper end opening 3a of the lid member 3B, thereby reducing the amount of protrusion of the movable stopper 19. More specifically, the restriction release lever 20 has an inclined face 20a at a tip end thereof, which is brought into engagement with an engagement bar 19a (portion to be engaged) of the movable stopper 19 with a circular cross-section, thereby causing the engagement bar 19a to be gradually retracted along the inclined face 20a of the restriction release lever 20. As a result, as shown in FIGS. 9A, 9B, and 9C, the amount of protrusion of the movable stopper 19 is reduced. Thus, stopper operation by the movable stopper 19 is released.

When the movable tray 2 is moved onto the table lift 18, height of the table lift 18 (up-down table 18a) is adjusted, and the restriction release lever 20 of the up-down table 18a is inserted into the upper end opening 3a, so that the restriction release lever 20 (inclined face 20a) pushes down the movable stopper 19 (engagement bar 19a). Since the upper end of the movable stopper 19 becomes as high as the upper end of the guide rail 5A (protruding portion 5a), restriction by the movable stopper 19 is released, thereby allowing the movable tray 2 to pass. In other words, the wheels 4 pass between right and left stopper restricting members 22. While the movable stopper 19 is released, the second locking device 13B of automatic locking type provided on the table lift 18 and the lid member 3B upseparably fixes the table lift 18 (up-down table 18a) to the lid member 3B. Under this condition, the guide rails 5B become continuous with guide rails 5C on the up-down table 18 of the table lift 18. In this manner, the movable tray 2 is moved stably onto the up-down table 18a of the table lift 18.

The second locking device 13B is configured to lock by engagement between a latch receiver 13Ba (engagement receiver) provided on the lid member 3B and a latch 13Bb (engagement member) provided on the up-down table 18a of the table lift 18. The latch receiver 13Ba is substantially U-shaped obtained by bending a linear member and attached on an outer peripheral side of the lid member 3B. The latch 13Bb is hook-shaped to be engageable with and disengageable from the latch receiver 13Ba. The latch 13Bb is associated with a latching restricting member 13Bc. The latching restricting member 13Bc selectively takes a first state in which engagement between the latch 13Bb and the latch receiver 13Ba is kept and a second state in which release between the latch 13Bb and the latch receiver 13Ba is kept. Switching between these states is performed against a spring force exerted by the spring (not shown). It should be noted that the latch receiver 13Ba and the latch 13Bb are provided on a lower side of the up-down table 18a.

The latching restricting member 13Bc is connected to a lock release ring 26 through a wire 26a. By pulling the lock release ring 26, the wire 26a is pulled, thereby causing the latching restricting member 13Bc to be switched from the first state to the second state, so that the engagement between the latch receiver 13Ba and the latch 13Bb is released.

As shown in FIG. 7, the table lift 18 is provided with a brake device 24 on wheels thereof. The brake device 24 is configured to hold the table lift 18 at a fixed position. The movable tray 2 can smoothly move linearly along the guide rails 5C provided on the table 18a of the table lift 18. When movement of the movable tray 2 onto the up-down table 18a of the table lift 18 is completed, the buffing rubber 15 provided at the rear end of the movable tray 2 is positioned by a stopper 25 provided on the table 18a, and a third locking device 13C of an auto locking type provided at the rear end of the movable tray 2 holds the movable tray 2 at a fixed position (see two-dotted line in FIG. 7). An engagement member of the third locking device 13C on the movable tray 2 side is engageable with and disengageable from the engagement member on the up-down table 18a, and is identical to the engagement member of the second locking device 13B on the movable tray 2 side (engagement member engageable with and disengageable from the engagement member on the casing 3A side).

By pulling the locking release ring 26 in FIG. 9A, the latch 13Bb rotates to cause locking between the table lift 18 and the lid member 3B (locking by engagement between the latch receiver 13Ba and the latch 13Bb) to be released, so that the table 18 becomes movable. Under this condition, the table lift 18 can carry the movable tray 2.

In the above construction, since the wires 11 within the casing 3A are connected to the battery wires 12 of the movable tray 2 by means of the connectors 6A and 6B, movement of the wires, which conventionally occurs, can be avoided. Therefore, the battery 1 can be inspected and replaced in a simple manner. Since the wires do not have an extra length, it is possible to inhibit the wires from being twisted or damaged when the movable tray 2 is being stored into the battery box 1 or pulled out therefrom. As a result, reliability of inspection and replacement of the battery 1 is improved, and a storage space for the wires to move therein is unnecessary within the battery box 3. This advantageously makes the battery box 3 small-sized.

Since the wires are separated from each other by using the connectors 6A and 6B, the movable tray 2 (battery 1) can be stored within the casing 3A regardless of the shape of the movable tray 2 or the battery 1. So, by preparing spare equipment such as battery and movable tray, replacement of the battery can be carried out without wiring. As a result, efficient maintenance is carried out.

By pulling the movable tray 2 from the inside of the casing 3A of the battery box 3, connection between the connectors 6A and 6B is released. So, the movable tray 2 (battery 1) can be pulled out and inspected safely with the electric connection cut off. Since wiring of the wires 11 within the casing 3A and wiring of the battery wires 12 are independently carried out, wiring efficiency is increased.

In general, the battery 1 for a railway vehicle 1 has a heavy weight. For this reason, it is difficult to make alignment only by using the guide pins 8 or the guide sockets 7 provided on the connector 6B or the receiving connector 6A. However, in this embodiment, by utilizing the engagement between the protruding portion 5a of the guide rail 5A and the circumferential concave groove 4a of the wheel 4 (guide means), an alignment range by the aligning means (guide socket 7 and the guide pins 8) of the receiving connector 6A and the connector 6B can be minimized. In other words, the guide rail 5A functions as guide means adapted to assist in alignment as well as a rail.

When the movable tray 2 is transferred by the table lift 18 to another place for the purpose of replacement the movable tray 2 or the like, the up-down table 18a of the table lift 18 is locked to the lid member 3B of the battery box 3 and restriction of the lid member 3B by the movable stopper 19 is released. By providing the guide rails 5C on the table lift 18, the movable tray 2 is safely moved onto the table lift 18. Also, by locking between the table lift 18 and the movable tray 2 by the third locking device 13C at the completion of movement of the movable tray 2, safety in carrying the movable tray 2 can be improved.

Alternatively, the battery box for a railway vehicle of the present invention can be configured as described as follows.

(1) While the battery box 3 is provided under the floor of the car body of the railway vehicle, this is only illustrative. The battery box 3 may be provided at other suitable locations.

(2) While wiring of the batteries 1 equipped on the movable trays 2 is carried out for each of the movable trays 2 and three movable trays 2 are provided, the number of movable trays 2 equipped with the batteries 1 may be two or one.

(3) While the guide sockets 7 as the pin receivers are provided on the casing 3A and the guide pins 8 are provided on the movable tray 2, the guide sockets 7 may be provided on the movable tray 2 and the guide pins 8 may be provided on the casing 3A.

(4) While the latch 13Bb is provided on the up-down table 18a and the latch receiver 13Ba is provided on the lid member 3B in this embodiment, the latch receiver 13Ba may be provided on the up-down table 18a and the latch 13Bb may be provided on the lid member 13B.

As described above, since wires for the battery 1 are divided into the wires 11 within the casing 3A and the battery wires 12 of the movable tray 2, and these are connected to each other by means of connectors 6A and 6B by using aligning means, movement of the wires, which occurs conventionally, can be avoided, and the battery 1 can be inspected and replaced in a simplified manner. In addition, the battery box 3 can be small-sized. By electrically disconnecting the battery wires 12 from the wires 11 within the casing 3A by separating the connectors 3A and 3B, the movable tray 2 can be pulled out from the battery box 3 and inspected safely.

In particular, since the guide means 5A and 4 assist in the aligning operation performed by the aligning means 7 and 8, the connector 6A and the receiving connector 6B can be connected to each other smoothly while being aligned regardless of heavy weight of the battery 1.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A battery box for a railway vehicle comprising:
a casing mounted on a car body of the railway vehicle;
a lid member configured to open and close an opening of the casing;

a movable tray equipped with a battery and stored within the battery box, the movable tray being capable of being pulled out through the opening;

a connector provided on the movable tray;

a battery wire configured to electrically connect the connector to the battery;

a receiving connector provided on the casing, the connector being separably connected to the receiving connector;

a wire provided within the casing and configured to electrically connect the receiving connector to a wire provided in the car body and located outside the casing;

a guide means configured to guide the movable tray to cause the connector to be connected to the receiving connector; and an aligning means provided on the movable tray and the casing and configured to align the connector and the receiving connector when the movable tray is stored in the casing.

2. The battery box for a railway vehicle according to claim 1, wherein the guide means is comprised of a guide rail provided within the casing and having a protruding portion extending along a longitudinal direction of the rail, the protruding portion having a substantially-inverted-U shaped cross-section, and a circumferential concave portion engageable with the protruding portion of the guide rail, the aligning means is comprised of a guide pin provided on one of the movable tray and the casing and a pin receiver provided on the other of the movable tray and the casing, the guide pin being engageable with and disengageable from the pin receiver, the battery box further comprising:

a first locking device provided on the movable tray and the casing and configured to lock the movable tray to the casing upon the connector being connected to the receiving connector.

3. The battery box for a railway vehicle according to claim 2, wherein the pin receiver is supported by the other of the movable tray and the casing so as to be displaceable in a moving direction of the movable tray and in a direction perpendicular to the moving direction.

4. The battery box for a railway vehicle according to claim 2, further comprising:

a positioning stopper provided within the casing and configured to restrict a front end position of the movable tray when storage of the movable tray within the battery box is completed; and an elastic member provided at a rear end portion of the movable tray and configured to elastically press an inner face of the lid member with the lid member closed after the movable tray has been stored in the battery box.

5. The battery box for a railway vehicle according to claim 1, wherein the lid member is locked to an up-down table of a table lift that carries the movable tray placed thereon by means of a second locking device, the second locking device is comprised of an engagement receiver provided on the lid member and an engagement member provided on the up-down table so as to be engageable with and disengageable from the engagement receiver, the lid member has a stopper provided on the inner face thereof to be protrusible and retractable, the stopper being configured to inhibit the movable tray from falling off the lid member provided horizontally in an open state, and a spring member configured to bias the stopper to protrude, and the table lift has a release member configured to reduce an amount of protrusion of the stopper by engagement with the stopper against a spring force exerted by the spring member when the up-down table set substantially as high as the lid member provided horizontally in an open state is locked to the lid member.

* * * * *